United States Patent [19]
Ploetz et al.

[11] 3,781,510
[45] Dec. 25, 1973

[54] APPARATUS FOR WELDING INTERRUPTED SEAMS

[75] Inventors: Ulrich Ploetz, Rostock-Warnemunde; Wolfgang Thiesen, Rostock, both of Germany

[73] Assignee: VEB Ingenieurburo Schiffbau, Rostock-Osthafen, Germany

[22] Filed: July 9, 1971

[21] Appl. No.: 161,004

[52] U.S. Cl. ............... 219/130, 219/125 R, 219/137
[51] Int. Cl. ............................................. B23k 9/00
[58] Field of Search ................... 219/137, 130, 136, 219/125, 124

[56] References Cited
UNITED STATES PATENTS

| | | | |
|---|---|---|---|
| 2,827,547 | 3/1958 | Tiedemann | 219/125 R |
| 3,522,410 | 8/1970 | Benfield | 219/130 |
| 1,933,340 | 10/1933 | Raymond | 219/124 |
| 1,884,645 | 10/1932 | Ford | 219/125 R |
| 1,539,383 | 5/1925 | Bienenstok | 219/125 R |

*Primary Examiner*—C. L. Albritton
*Assistant Examiner*—George A. Montanye
*Attorney*—Albert C. Nolte, Jr. et al.

[57] ABSTRACT

Welding apparatus is traversed along a weld gap to be welded, from one interruption of the required weld seam to another such interruption. Incident thereto, the apparatus is manipulated so that near the first interruption the weld arc is in trailing position but near the second interruption it is in leading position relative to the welding apparatus.

4 Claims, 7 Drawing Figures

INVENTORS
ULRICH PLOETZ
WOLFGANG THIESEN

BY *Nolte & Nolte*

ATTORNEYS 3,781,510

APPARATUS FOR WELDING INTERRUPTED SEAMS

BACKGROUND AND NATURE OF THE INVENTION

Heretofore great difficulty has been encountered, particularly in the construction of ships, when it was necessary to weld long seams interrupted by structural elements, cross-seams and the like. Ordinary full-automatic welding techniques were unable to produce the entire seam under such conditions, and special semi-automatic methods, known up to now, were in no position to produce such an entire seam effectively or economically. Therefore hand welding was used, particularly at the end points or interrruptions of such a seam, but the combined or frequently alternating uses of hand welding and of (full or semi-) automatic welding was unattractive. This applied particularly when the automatic welding was done with relatively heavy apparatus, which however was needed for desirable shielded-arc procedures and the like.

The invention enables an automatic welding device to operate from beginning to end of an interrupted weld seam, without assistance of hand welding and the like, and with full use of shielded arc nozzles and other auxiliaries. The invention achieves this by manipulating the automatic welding apparatus so that at the beginning of the interrupted seam (near a first cross-profile or the like) the arc is in trailing position after the apparatus itself but thereafter, near the end of the interrupted seam (near a second cross-profile or the like) the arc is in leading position.

DRAWINGS

DETAILED DESCRIPTION

Figure 1:
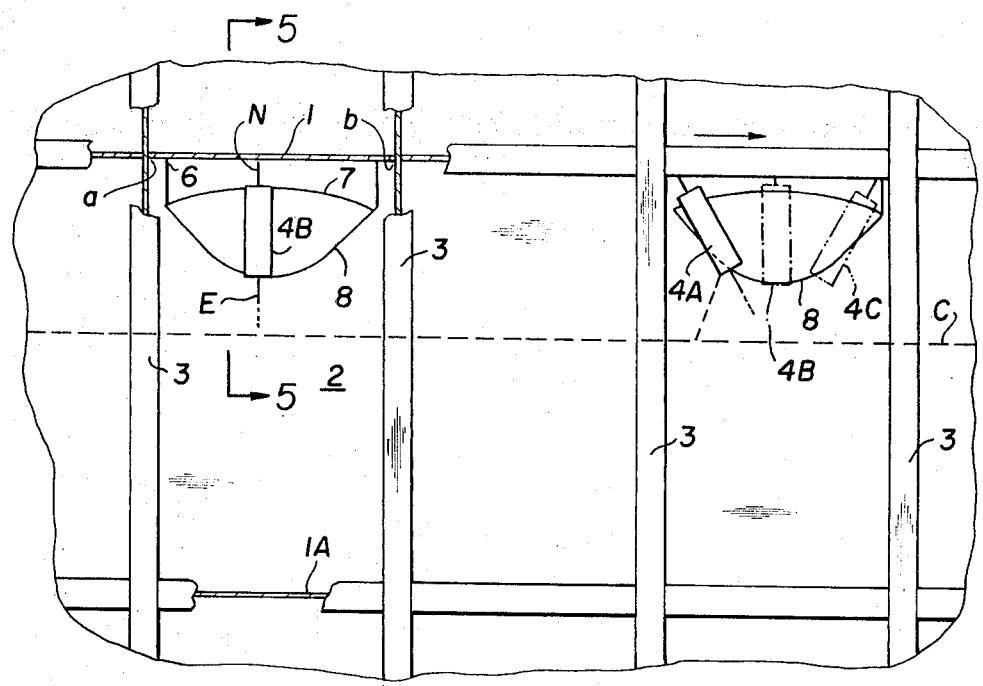
FIG. 1 is a schematic plan view of a system of weld pieces in process of being welded by the new method and apparatus.
Figure 4:
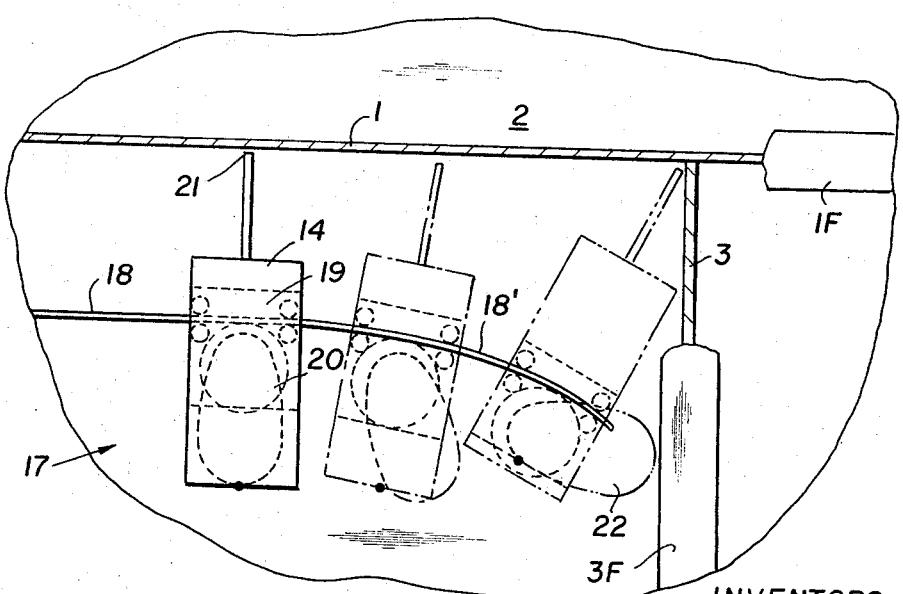
Figure 5:
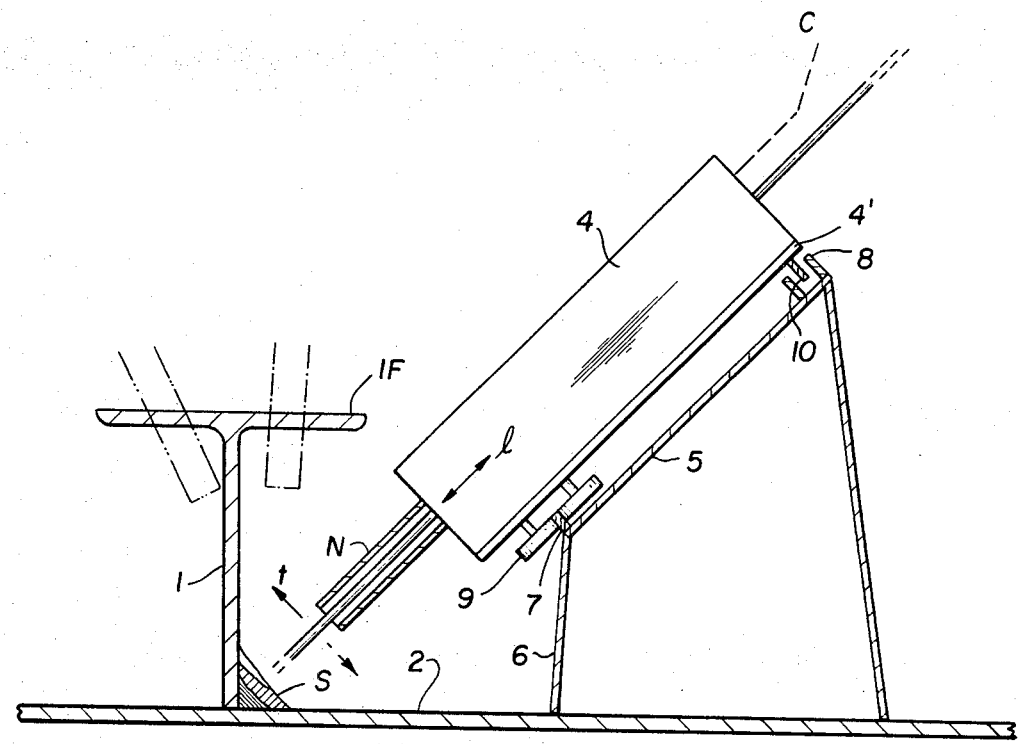
FIG. 5 is a sectional view, taken along lines 5—5 in FIG. 1.

Referring basically to FIGS. 1 and 5: A profile 1 is welded to plate 2, between corners $a$ and $b$, by continuous straight fillet weld seam S. Thus far it was one of the main problems that the flange 1F of profile 1 interfered with normal or desirable electrode positions, such as indicated in broken lines in the area of flange 1F and in the corners under flanges 3F (FIG. 4, said corners being shown in FIG. 1 at $a$ and $b$).

According to the invention this problem is overcome by so manipulating apparatus 4 as to orient it consecutively in initial position 4A, wherein the welding tip T and nozzle N are trailing relative to the welding traverse directions shown by an arrow in FIG. 1; intermediate positions 4B; and ultimate position 4C wherein the tip and nozzle are leading.

Figure 6:
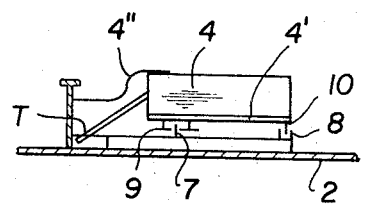
FIGS. 6 and 7 are views taken along lines 5—5 in FIG. 1 to show different forms of apparatus and structure involved in performance of the new method or forming part of the new apparatus.

For this purpose guide tracks 7 and 8 are provided between consecutive cross girders 3 and laterally adjacent the projected seam, and welding apparatus 4 has a guide unit so engaging the two specially curved tracks as to produce these changes of orientation incident to the traversing motion. As schematically shown in FIG. 5, track 7 is engaged by guide rollers 9, while double track 8 is contacted by guide pin 10. These guide rollers and guide pin are mounted at a fixed distance from one another on undercarriage 4' whereon welding apparatus 4 is longitudinally but not transversely slidable, and means are provided to keep this apparatus at predetermined distance from the work area, for example by feeler 4'' (FIG. 6) and feeler control apparatus (not shown). The position and orientation of automatic welder 4 also determines the positions and orientations of nozzle N and electrode supply E thereof. The curvature of tracks 7, 8, required for these effects, can be determined empirically or mathematically or by combined empirical and mathematical methods, as will be understood on consideration hereof.

It will be understood that welder 4 and its electrode E and nozzle are traversed along the corner between straight profile 1 and plate 2. The welding apparatus 4 can hold the welding tip in fixed position or can oscillate it transversely (t in FIG. 5) or longitudinally up and down (1 in FIG. 5). The transverse oscillation $t$ enables the device for example to produce a fillet weld seam S of suitable curvature in a vertical plane. The longitudinal electrode motions 1 cooperate with the motions of the welder 4 on it curved tracks to keep the welding arc on the straight seam S.

Figure 2:
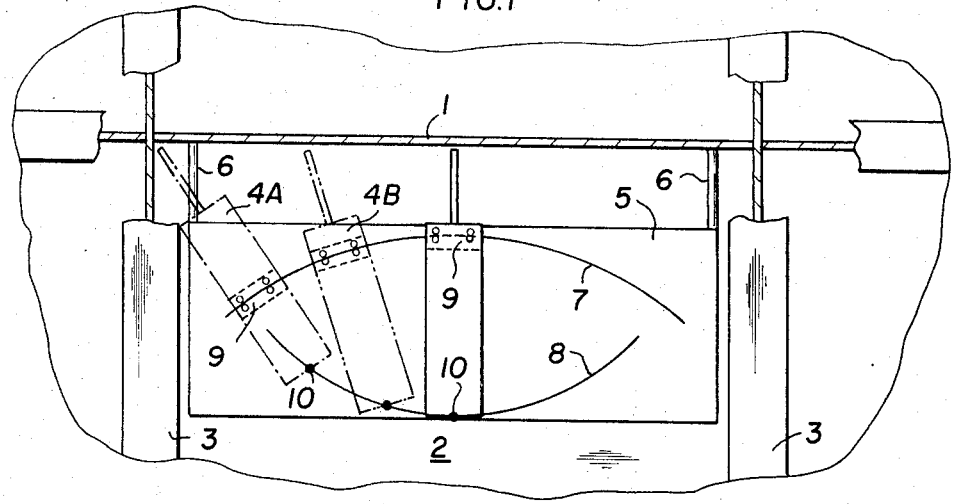
FIG. 2 is a generally similar view, drawn on a somewhat larger scale and covering a principal portion of the welding area to show a first system of guides forming part of the new apparatus.
Figure 7:
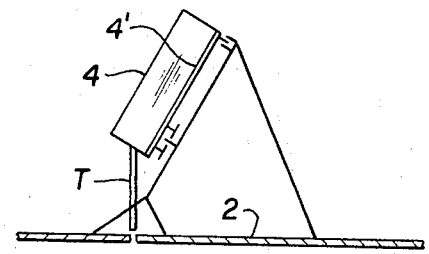

By the guide means and auxiliary apparatus of FIGS. 1, 2 and 5, the new apparatus is enabled to perform the desired welding operation from point a underneath a first crossing of profile flanges 1F, to the aforementioned point b under a second flange crossing symmetrically located relative to the first. It will be understood that, instead of reorienting the entire welding apparatus as in FIG. 1, it is also possible to produce different orientations of the weld top T relative to the welding apparatus 4, some of which are exemplified by FIGS. 6 and 7.

Guide tracks 7 and 8 can either be clamped or bolted or tack-welded to the aggregate of plate 2 and profiles 3, depending on whether use is made of heavy welding apparatus 4 with control means enabling it to perform a great variety of manipulations and weld tip operations, or whether a relatively light device is used which the worker can manually carry from one workside to the next, and several of which (for example as in FIG. 1) a single worker can supervise, as they operate in different cells 1 – 2 – 3.

The devices can also be varied with respect to details of their guide mechanism. For example:

FIG. 2 shows a system wherein the aforementioned guide tracks 7, 8 are mounted on a portable plate 5, held at predetermined distance from profile 1 by rods 6. A track and support unit of this kind can be carried and installed by one or two workers on relatively small jobs.

Figure 3:
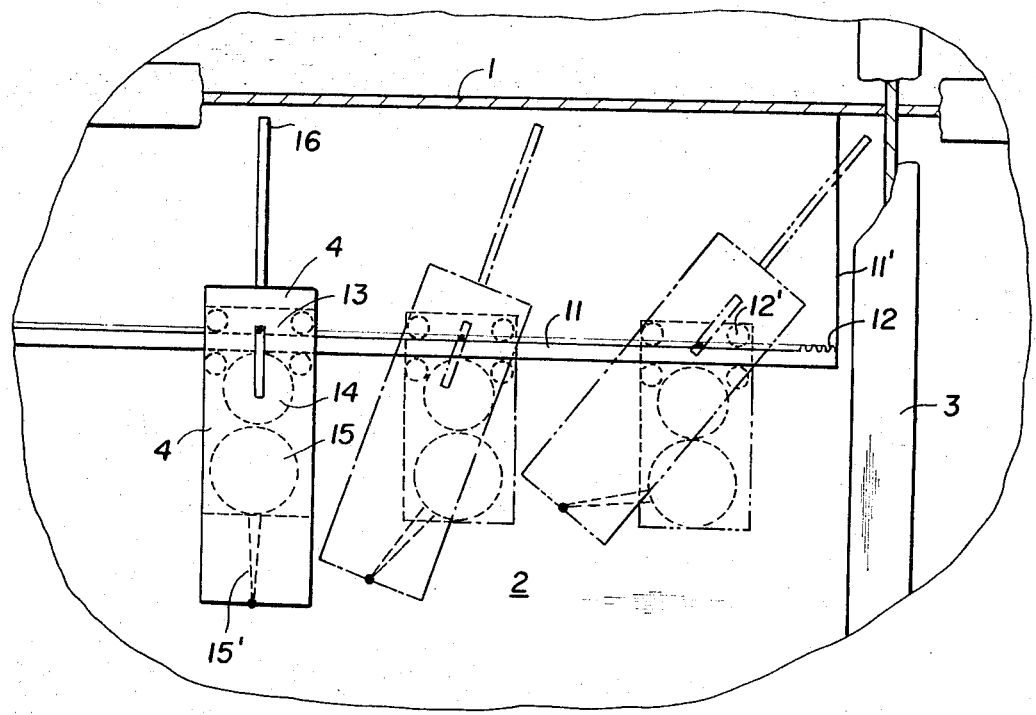
FIGS. 3 and 4 are views generally similar to FIG. 2 but showing a second and third systems of guides.

FIG. 3 shows a modified system wherein a straight guide rod 11 extends along profile 1, being spaced therefrom for example by plate 11'. Rod 11 may have teeth 12 engaged by gears 12' in guide unit 13 whereon welding apparatus 4 is angularly and longitudinally shiftable. A pinion 14 engaging rod 11 and driving control gear 15 with radial arm 15' can be used, with the aid of clutch or control mechanism (not shown) to slide and swing welder 4 on unit 13 in such a way that welding tip 16 traverses longitudinally along profile 1, at uniform distance therefrom, while the positions and orientations of the welder are changed as shown.

Still another guide unit 17 is shown in FIG. 4, wherein straight edge member 18 has curved ends 18' and is engaged by guiding unit 19 which supports welding apparatus 4. Also provided is a control unit 20 interposed between guide unit 19 and welder 4. This control unit can include a portable guide track 22. In response to traversal from straight track 18 to curved track 18', the control unit swings portable guide track 22 into progressively deflected positions as shown, and thereby causes progressive swinging and sliding motions of welder 4 on unit 19, as also shown, by means of a mechanism which obviously can be developed by persons skilled in the art, in the light of this disclosure, to move welding nozzle 21 through the desired positions and orientations, unimpeded by flanges 1F and 3F of the profile members. It will further be seen that longitudinal track 18 obviously can be composed of any desired numbers of individual elements, suitably interconnected endwise, or can telescope to desired length between the limiting profiles.

What is claimed is:

1. An arc welder for welding a workpiece with a seam to be welded extending in a single plane and abutted at each end of the seam by first and second elements each extending in a respective plane intersecting transversely the plane of the seam, comprising an electrode having a tip from which an arc is established, a track generally extending along the length of the seam, means mounting the welder in engagement with the track for movement along the track, and means moving said welder along said track to weld said seam from said first element to said second element while maintaining the electrode tip at a substantially constant distance from the seam, said means for moving comprising, means positioning said welder in a first position to direct said electrode at an acute angle to the plane of the seam at said first end element to initiate said weld, means moving said welder while welding from said first position through a second position in which said electrode is directed normal to the plane of the seam, and means positioning said welder in a third position to direct said electrode at an acute angle to the plane of the seam at said second end element to finish the weld.

2. An arc welder according to claim 1, in which the mounting means is displaceable in directions toward and away from the tip for maintaining the tip at said substantially constant distance from the seam.

3. An arc welder according to claim 1, in which the positioning means comprises means for angularly displacing the electrode relative to the mounting means to effect said changing of the orientation.

4. An arc welder according to claim 1, in which said track is curved in segments thereof closest said first and second elements.

* * * * *

UNITED STATES PATENT OFFICE
CERTIFICATE OF CORRECTION

Patent No. 3,781,510                              Dated December 25, 1974

Inventor(s) Ulrich Ploetz et al.

It is certified that error appears in the above-identified patent and that said Letters Patent are hereby corrected as shown below:

Column 4, lines 25, 26 (claim 3) delete "to effect said changing of the orientation"

Signed and sealed this 18th day of June 1974.

(SEAL)
Attest:

EDWARD M. FLETCHER, JR.                    C. MARSHALL DANN
Attesting Officer                          Commissioner of Patents